United States Patent [19]

Park

[11] 4,331,911
[45] May 25, 1982

[54] METHOD OF EQUALIZING THE VOLTAGES OF THE INDIVIDUAL CELLS OF STORAGE BATTERIES

[76] Inventor: Robert H. Park, 1510 W. Demeter Dr., Freeport, Ill. 61032

[21] Appl. No.: 234,884

[22] Filed: Feb. 17, 1981

Related U.S. Application Data

[63] Continuation-in-part of Ser. No. 908,447, May 22, 1978.

[51] Int. Cl.³ .............................................. H02J 7/08
[52] U.S. Cl. ...................................... 320/14; 320/17; 320/39
[58] Field of Search ....................... 320/2, 3, 8, 14, 15, 320/17, 18, 20, 39, 40

[56] References Cited
U.S. PATENT DOCUMENTS 3,305,754  2/1967  Oaks et al. ......................... 320/40 X
4,079,303  3/1978  Cox ....................................... 320/17

Primary Examiner—Robert J. Hickey

[57] ABSTRACT

There is disclosed a method of equalizing the voltages of the individual cells of a storage battery that consists in the steps of, 1. providing a single input circuit type of d.c. to d.c. converter incorporating multiple output circuits equal in number to the number of cells of the battery to which it is planned that the converter will make connection, with the converter so designed and employed that, with its input circuit connected to the terminals of the battery, and one of each of its output circuits connected across one of each of the cells of the battery, flow of cell equalizing current will hold low so long as the downward departures of the voltages of the battery's cells from average cell voltage hold below a prescribed index value.

2. providing, via method of converter design and employment, and choice of the above referred to index value, so that, for a given type, size, and prior condition of use of a battery, employment of the converter as in step 1 above can be expected to provide a cost-effective way to both favorably affect the equality of the battery's cell voltages, and avoid cell voltage reversal during battery discharge under contemplated conditions of the battery's use.

3. providing to connect one of each of the output circuits of the converter across one of each of the individual cells of the battery.

4. providing so that when the battery is in active use the input circuit of the converter will be energized from the battery's terminals.

5. providing a means of indicating when the extent of inequality of the cell voltages of the battery is such as to cause converter input current to exceed a preset value.

2 Claims, 1 Drawing Figure

METHOD OF EQUALIZING THE VOLTAGES OF THE INDIVIDUAL CELLS OF STORAGE BATTERIES

CROSS REFERENCE TO RELATED APPLICATION

This application represents a continuation-in-part of my earlier application No. 908,447, filed May 22, 1978.

BACKGROUND OF THE INVENTION

1. Field of Invention

The field of the present invention relates to providing for,
  a. equality of the cell voltages of a battery during processes of discharge and charge.
  b. avoiding cell reversal during discharge under conditions of contemplated service use.

2. Description of the Prior Art

The usually employed method of equalizing battery cell state of charge, and preventing cell reversal on discharge, consists in providing,
  a. to, insofar as feasible, equalize the state of charge of all cells by charging the battery to and beyond the point at which further charging does little to increase cell state of charge, and,
  b. to restrict depth of discharge,
processes which both waste energy, and reduce the effective energy storage capacity of the battery.

In the case of nickel-cadmium batteries a problem that is encountered in their use resides in the fact that, following on a sufficient number of cycles of discharge and recharge the voltage that is attained on charge begins to decrease, at which point it is customary to subject the battery to a process of prolonged discharge at low current, a procedure that is termed reconditioning. In ordinary uses of nickel-cadmium batteries, as for example in the case of batteries of aircraft type, the procedure is to first effect a partial discharge of the entire battery, and next, proceed to discharge each cell individually, by applying a resistor across its terminals.

When it comes to nickel-cadmium batteries planned for use in space vehicles, including earth satellites, the problem arises that it is not possible, or at any rate has hardly seemed to be practicable to provide to discharge cells individually as a last stage of a process of reconditioning, and this has meant that such reconditioning as has been provided for has had to be carried out via restricting to only partial discharge, since, with employment of full discharge it would have to be counted on that there would be a reversal of the potential of the weakest cells, with the net effect that those cells would be permanently damaged.

Following on the 1972 experience of difficulties with the Skylab Apollo Telescope Mount satellite, that had relation to battery performance, NASA's Marshall Space Flight Center initiated a program of development of a Ni-Cd battery cell reconditioning circuit (1) which had for its purpose rendering it possible to completely discharge one of two or more batteries with which a space vehicle is equipped without incurring cell reversal.

Subsequent to the 1976 publication of reference (1) the Marshall Space Flight Center carried out the design of several prototype Ni-Cd battery reconditioners, which, when tested, not only proved capable of performing as planned for, but also demonstrated that their employment rendered it possible to continue to employ a Ni-Cd battery as a power source even after one of its cells had developed a condition of open circuit, a finding that led to use of the term battery protective circuit in place of the term battery reconditioner.

In the Marshall Space Flight Center battery protective circuit use is made of a single input circuit d.c. to d.c. converter equipped with output circuits equal in number to the number of cells of the battery that is to be protected, which, in designs to date has been 22, or a multiple of 22, with the number of converters employed made equal to the total number of battery cells divided by 22.

The present invention represents a modified form of the Marshall Space Flight Center battery protective circuit in which the approach is to start from the basic method of battery protection that it embodies, and so modify it that it will be well adapted to serve as a way to protect batteries that are made use of on terra firma, and in aircraft, where, if need be, Ni-Cd batteries can be reconditioned by manually applying shorting resistors to individual cells, and a defective cell can be manually replaced.

Two key aspects of the writer's modified approach to battery protection are to,
  a. employ a d.c. to d.c. converter transformer turns ratio so chosen that only small reductions of the voltage of a cell below average cell voltage will result in flow of a consequential amount of converter output circuit current into the cell in question.
  b. employ d.c. to d.c. converters the cost of which has been reduced by designing them so that their rated allowable output current is lower than the planned for maximum current drain on the battery, an approach that is viable since a battery cell that loses charge so rapidly, or fails in the area of charge acceptance so greatly, that cell reversal cannot be prevented, can be dealt with by manually effected cell removal and replacement. Items (a) and (b) above stand in contrast to the Marshall Space Flight Center approach to battery protection in which,
  c. with average cell voltage at or above the 1.25 volts level converter no load output voltage is of the order of 0.8 to 0.85 volts (2), and flow of output circuit current into a defective cell, in other than wholly negligible degree, fails to take place until cell voltage drops to 0.7 (1,2)
  d. the protective scheme design concept has come to be to provide so that a battery will be able to deliver its maximum planned for discharge current even when one or several of its cells have opencircuited.

SUMMARY OF THE INVENTION

The present invention provides a means of continuously equalizing the voltages of the individual cells of storage batteries under conditions of service use.

A main object of the invention is to prevent the voltage reversal of, and damage to, weak cells during planned for processes of battery discharge.

Another object is to allow an increase in the safe depth of discharge of storage batteries.

Another object is to provide a way of equalizing the states of charge of the individual cells of storage batteries under conditions of charge, and thereby either minimizing or avoiding need to overcharge.

Another object is to favorably affect achievement of equality of state of charge of the cells of a battery that is being rapidly only partly charged.

A further object is to minimize drop in voltage of batteries with increase in load and state of discharge.

Still another object is to allow use of a smaller storage battery than would otherwise be required.

Yet another object is to bring about an increase in battery discharge-recharge cycle life.

DETAILED DESCRIPTION OF THE INVENTION

Figure 1:
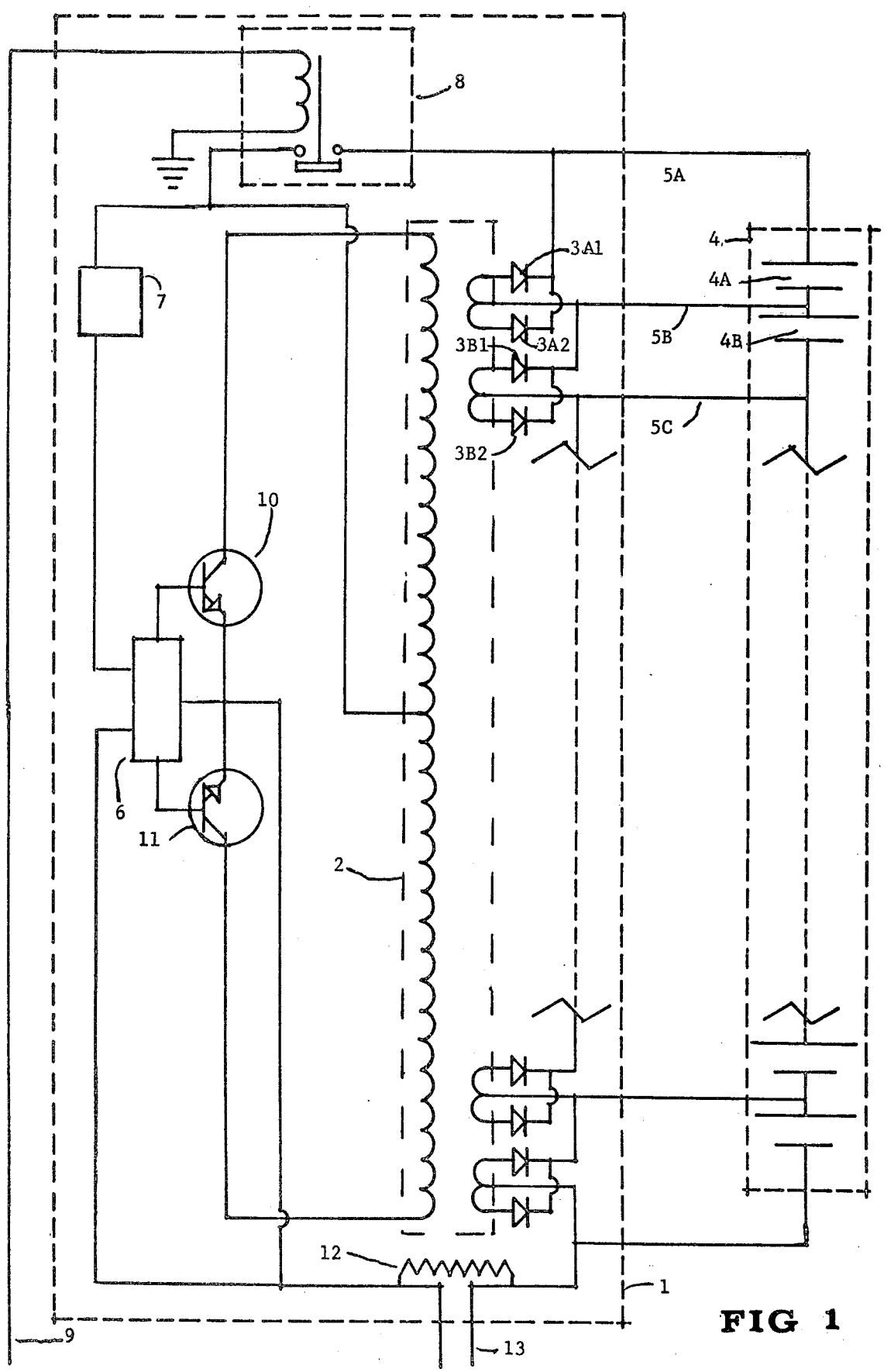
FIG. 1 shows schematically the components and wiring diagram of a storage battery to which is coupled what can be termed a battery cell equalizer.

Referring to FIG. 1, which is generally similar to FIG. 5 of reference (1), and to FIG. 2 of the writer's copending application Ser. No. 908,447, item 1 comprises a d.c. to d.c. converter incorporating transformer 2, which, in reliance on the findings of NASA's Marshall Space Flight Center, will preferably be provided with an annular core wound from one mil thick high permeability and resistivity alloy (2), and employ a single toroidally wound primary, overlaid with a group of toroidally wound secondaries, with the number of secondaries chosen equal to the number of cells of the battery the cells of which it is planned to equalize, except that, when the number of cells is sufficiently large it can prove to be desirable to employ more than one transformer, each equipped with secondary windings equal in number to the number of the battery's cells divided by the number of transformers, which, in such case must represent an integral number.

As shown, with use of diodes 3A1 and 3A2, and leads 5A and 5B, the secondary circuit that is uppermost in FIG. 1 is arranged to apply a rectified a.c. voltage across cell 4A of battery 4.

Similarly, with use of diodes 3B1 and 3B2, and leads 5B and 5C, the next in line secondary circuit applies a rectified a.c. voltage across cell 4B of the battery, and so on down the line, until the last secondary winding makes connection to the last cell.

Item 6 comprises an oscillator which receives power from a battery 4 via regulator 7 when and as relay 8 is energized over lead 9, a step which also serves to energize the mid point of the primary winding of transformer 2.

Oscillator 6, which, per Marshall Space Flight Center experience is preferably designed to develop a frequency chosen to be in the range of 5,000 to 10,000 cycles, operates to alternately cause transistor switches 10 and 11 to pass current, thereby exciting the primary of transformer 2 at the chosen frequency, and developing voltages of that frequency in each of the transformers output circuits.

Item 12 is a shunt, while item 13 comprises a pair of leads by means of which the voltage across the shunt can be transmitted to a relay, not shown, which would be arranged so that, when energized it would cause a light to illuminate, and/or a buzzer to sound, when and as the voltage across the shunt exceeded a preset value.

In Marshall Space Flight Center practice the converter has been designed to feed into a 22 cell battery, and its transformer has been equipped with 22 secondaries of two turns each, and a 60 turn primary taking the form of 30 bifilar wound turns. In laboratory testing, with 28 volts applied to the converter input, the open circuit voltages of the secondaries have been in the range of 0.80 to 0.85 volts (3) while other than negligible flow of current from a secondary into a weak cell only begins when its voltage drops to 0.70 (1,3).

In contrast, in the present invention it is called for that the turns ratio of the transformer will be reduced to a value which will cause a not inconsequential flow of equalizing current into a weak cell when its voltage falls only a little below average cell voltage, with the extent made to depend on the degree of mismatch of cell voltages that requires to be viewed as not warranting correction.

As pointed out in reference (1), in employment of nickel-cadmium batteries in space vehicles it has been customary to carefully select cells so that those in any one battery will possess closely matched properties, a requirement that it has been evidenced can be lessened with employment of the type of battery protective circuit described in that reference, and that the Marshall Space Flight Center has presently under development.

Matching of nickel-cadmium cells that would be series connected in use has, also, long been practiced in non-aerospace employment as a way to protect against cell voltage reversal.

In use of the present invention, it should, in the writer's view, be possible to minimize or entirely eliminate need to match series connected cells, though when this is done it should be borne in mind that the effect will be that there will be a consequent need to reduce transformer primary to secondary turns ratio, from the ratio that would advantageously be employed when matching has been provided for.

Again, as the number of discharge-recharge cycles of a battery increases it can be counted on that, in due course, the non-matching aspect of a battery's cells will become more pronounced than applied to the cells when new, which being the case, unless such eventual increase in degree of mismatch over the desired life of a battery has been taken into account in advance it can be expected that, in order to allow obtaining desired performance when battery cycle life increases, it could prove advantageous to provide for ready electrical insertion of either a fixed or a variable ratio transformer or autotransformer ahead of the multiple secondary unit, as a way to allow achieving the same effect as ability to increase its primary to secondary turns ratio.

Further, whereas it is understood that, in Marshall Space Flight Center practice their battery protection circuits have been so designed that converter output circuits would be able to deliver current in amount equal to maximum contemplated battery discharge current, with the end in view that flow of battery current would not be interrupted even if a battery cell became open circuited, in non-aerospace applications an open circuit situation could be dealt with by removing the defective cell and replacing with another, and it could well prove to be the case that, at any rate in some applications, employment of a converter that would be designed to supply only say ten or twenty percent of anticipated maximum battery discharge-recharge current would serve to provide all needed battery protective effect over the anticipated period of battery use.

In this area the point applies that provision to see to it that the flow of more than a preset amount of current into the input circuit of the d.c. to d.c. converter would be signalized by the illumination of a signal light, or the sounding of a buzzer, or both; would render it possible for an equipment operator, or an attendant, or watchman to be informed when the condition of mismatch of the cells of a battery had developed to a point where there could be a need to replace a defective cell, or a group of such cells.

Thus, as noted above, a variety of factors, including but not limited to type of battery cell, method of manufacture as affecting degree of mismatch of cells, conditions of battery use, and the degree of importance of holding battery energy use low, are involved when it comes to arriving at a best choice of the design of what, at this point, will be referred to as a battery cell voltage equalizer. Also, since the influence of these factors on the life of the cells of a battery to which has been connected a cell voltage equalizer having a given maximum equalizing current supply capability cannot be predicted absent the availability of, as a minimum, test data that would simulate anticipated conditions of battery service use, it needs to be recognized that what has been set forth above in the way of disclosure as to how to produce an equalizer of the cells of a battery, will, in practice, need to be supplemented by tests, and preferably supplemented also, by observations of performance under service use conditions, in order to allow arriving at what would turn out to represent a cost-effective design.

Whereas, in the above, reference has been principally made to batteries of nickel-cadmium type, it seems not unlikely that, in specific areas of use, tests and service use will be found to demonstrate that batteries of other types can advantageously be equipped with cell voltage equalizers of the type that has been described.

Where, in what has gone before, attention has been principally directed to providing for cell voltage equalization under what has been referred to generally as conditions of service use, it is to be understood that, in the case of nickel-cadmium batteries, periodic battery reconditioning requires to be included in that term, though not without bearing in mind that, in non-aerospace uses, it is always possible, even if inconvenient, to employ manual shorting out of individual cells through resistors, as a way to deal with situations in which an equalizer of a given transformer secondary current output capability might not suffice to prevent cell reversal during the reconditioning process.

Where in FIG. 1 there is shown one transformer and one oscillator, it is to be understood that in use of a d.c. to d.c. converter equipped with more than one transformer it can suffice to employ a single oscillator that has been equipped with independent output circuits equal in number to the number of transformers.

It is also to be understood that there can be situations in which, when a battery is being made use of intermittently, it can be advantageous to provide to automatically deenergize relay 8 during periods of non use and reenergize it when use resumes or is about to resume, with the objective of economizing on use of battery power for purposes of d.c. to d.c. converter operation during such periods, though, in periods of non use of the battery it could also be desirable to provide to periodically reenergize relay 8 for predetermined time periods, or for periods dependent as regards their duration on the voltage across shunt 12 just prior to deenergization.

A further point is that, in some applications, it could be in order to replace relay 8 with a manually operated switch, or with a bolted connection, while, in other applications it could prove advantageous to provide so that relay 8 will hold open for all, or for predetermined portions of, time periods within which there is no prospect of battery discharge, or the prospect is that battery discharge would take place only slowly.

TABLE OF REFERENCES

1. Roy Lanier, "A nickel-Cadmium battery reconditioning circuit" NASA Technical Note-NASA TN D-8500, National Aeronautics and Space Administration, Washington D.C., June 1977.
2. Telephone conversation with Roy Lanier, Aug. 13, 1979.
3. Telephone conversation with Roy Lanier, July 28, 1980.

CLAIM TERMINOLOGY

In use of Marshall Space Flight Center's nickel-cadmium battery protection circuit, wherein the diodes are chosen to be of low forward voltage drop type, when that device makes connection to a 22 cell battery that is operating at or near 28 volts and 20 amperes of battery discharge current, with the voltages of all but one cell at around 1.25 volts, the d.c. to d.c. converter transformer output circuit that makes connection to that one cell will begin to supply it with cell voltage equalizing current when and as its voltage drops to or below 0.7 volts, while 30 amperes will be delivered when its voltage drops to 0.5 (2).

Somewhat lower voltages would produce the same results were diodes other than of low forward voltage type to be employed.

The ampere hour, or coulomb, efficiency of the individual cells of a battery, by which is meant the ratio of output to input ampere hours, or coulombs, when the battery is repetitively subjected to some particular regime of discharge and recharge, can vary substantially in a manner dependent on a variety of factors, including, but not limited to, battery type, the existing state of charge of each of the battery's electrodes, how the battery has been manufactured, how recently it has been subject to overcharge, and the past history of the manner in which it has been discharged and recharged, including in the case of nickel-cadmium batteries, the last date and method of employment of cell reconditioning.

Accordingly, even in the absence of the earlier development of some particular defect, such as an internal short circuit of high enough impedance that, while it injures the cell, yet fails to result in its being taken out of service, except when a battery that is subject to repeated discharge and recharge is either, a. periodically overcharged, or,
b. has been equipped with some other means of cell equalization, the states of charge of its cells that are least ampere hour efficient will progressively fall below the states of charge of the others, and in due course, cell reversal of the low sufficiency cells will take place.

This, in turn, implies that when a battery is made use of in conjunction with a parallel type of engine electric hybrid drive system for a road vehicle, in which the battery would be called on to be very rapidly only partly charged prior to discharge, as called for in an approach to hybrid drive that has been studied by the Ford Motor Co., and that represents an aspect of what is set forth in the writer's copending patent application Ser. No. 908,447, there is a special need for employment of a cell voltage, and hence cell state of charge equalizing system.

However, even when it is provided for that a battery will be periodically overcharged, as say in the case of a propulsion battery of a vehicle whether of all-electric or engine-electric type, once per day, provision of supplementary means of cell voltage equalization can represent a useful way to prevent both cell reversal, and loss of battery effective energy storage capability under conditions of sustained service.

In the above connections, whereas it is a feature of the present invention that it calls for use of a smaller d.c. to d.c. converter transformer primary to secondary turns ratio than has been employed by the Marshall Space Flight Center in its battery protective circuits, the question arises as to how far to go in this direction.

Even if all the cells of a battery were new and exhibited little in the way of differences, use of too small a ratio would result in continuous flow of equalizing current into all battery cells, and a consequent excess thermal load on the converter, plus a waste of battery charge.

On the other hand use of too high a ratio would have the effect of permitting an undesirable progressive deterioration of the state of charge of weak cells.

It follows that there will be an optimum transformer turns ratio the value of which will depend on the type, make, and past history of the battery under consideration.

What is needed is a turns ratio that will cause equalizing current to flow into no more than a few cells, and, more particularly into that one, or those few, for which the downward departures of their voltages from battery average cell voltage is greatest.

In the case of new nickel-cadmium batteries the above might imply the desirability of employing a turns ratio that would result in flow of other than an inconsequential amount of equalizing current into cells the voltage of which was 50 millivolts below average, though possibly tests and experience would show that the turns ratio used should be based, rather, on a cell voltage departure from average of 100 millivolts.

As a battery gradually deteriorates in use, in order to prevent putting an undue load on the converter it will or could be needed to provide to employ a turns ratio greater than the figure that would have best served the needs of the battery when it was new.

Now in the light of the foregoing, the question comes up as to how to write patent claims that would not be so long and involved as to be difficult to understand.

In this area my approach has been to endow the word "low" with special meaning, and specify that where, in the claims, the word "low" is used in the context of the wording "flow of equalizing current will be held low" it is to be understood that "low" is intended to mean low enough to neither overload the d.c. to d.c. converter, nor cause waste of energy stored in the battery, yet not so low as to preclude the taking place of response of the converter in the form of supplying equalizing current to weak cells if and when the downward departures of their voltages from average exceed what in the claims is referred to as a "prescribed index value."

While there has been shown and described what is considered to be a preferred embodiment of the invention, and there has been set forth the best method contemplated for carrying it out it will be understood that various modifications may be made therein. It is intended that all such modifications which fall within the true spirit and scope of the present invention.

What I claim is:

1. The method of equalizing the voltages of the individual cells of a storage battery which consists in the steps of,
   1. providing a single input type of d.c. to d.c. converter incorporating output circuits equal in number to the number of cells of the battery to which it is planned that the converter will make connection, with the converter so designed and employed that, with its input circuit connected to the terminals of that battery, and one of each of its output circuits connected across one of each of the cells of the battery, flow of cell equalizing current will hold low so long as the downward departures of the voltages of the cells from average cell voltage hold below a prescribed index value.
   2. providing via method of converter design and employment, and choice of the above referred to index value, so that, for a given type, size, and prior condition of use of the battery, employment of the battery as set forth in step (1) above can be expected to provide a cost-effective way to both favorably affect the equality of the battery's cell voltages, and avoid cell reversal during discharge under contemplated conditions of the battery's use,
   3. providing to connect one of each of the output circuits of the converter across one of each of the individual cells of the battery,
   4. providing so that when the battery is in active use the input circuit of the converter will be energized from the battery's terminals.

2. A control system adapted for use in the charging of storage batteries of a given type, which incorporates a single input circuit type of d.c. to d.c. converter incorporating multiple output circuits equal in number to the number of cells of the type of battery to which it is planned that the output circuits of the converter will make connection, with the converter so designed that, with its input circuit connected to the terminals of the battery, and one of each of its output circuits connected to one of each of the cells of the battery, flow of cell equalizing current will hold low so long as the downward departures of the voltages of the battery's cells from average cell voltage hold below an index value that has been so chosen that employment of the converter as a means of equalizing the voltages of the individual cells of batteries of the said given type can be expected to provide a cost effective way of both favorably affecting the equality of the voltages of the battery's cells, and avoiding cell reversal under contemplated conditions of battery use.

* * * * *